US011210324B2

(12) United States Patent
Quirk et al.

(10) Patent No.: US 11,210,324 B2
(45) Date of Patent: Dec. 28, 2021

(54) RELATION EXTRACTION ACROSS SENTENCE BOUNDARIES

(71) Applicant: Microsoft Technology Licensing, LLC, Redmond, WA (US)

(72) Inventors: Christopher Brian Quirk, Seattle, WA (US); Hoifung Poon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1441 days.

(21) Appl. No.: 15/173,349

(22) Filed: Jun. 3, 2016

(65) Prior Publication Data

US 2017/0351749 A1    Dec. 7, 2017

(51) Int. Cl.
*G06F 16/31*      (2019.01)
*G06F 16/34*      (2019.01)
(Continued)

(52) U.S. Cl.
CPC .......... *G06F 16/316* (2019.01); *G06F 16/345* (2019.01); *G06F 40/295* (2020.01); *G06F 40/35* (2020.01)

(58) Field of Classification Search
None
See application file for complete search history.

(56) References Cited

U.S. PATENT DOCUMENTS 7,283,958 B2 * 10/2007 Azara .................. G06F 40/35
                                                    704/257
7,415,414 B2 *  8/2008 Azara .................. G06F 40/35
                                                    704/270
(Continued)

FOREIGN PATENT DOCUMENTS

CN     104834735       5/2015
WO     WO2015080561   6/2015

OTHER PUBLICATIONS

Yang et al., "Context-aware Learning for Sentence-level Sentiment Analysis with Posterior Regularization;" Proceedings of the 52nd Annual Meeting of the Association for Computational Linguistics, pp. 325-335, Baltimore, Maryland, USA, Jun. 23-25, 2014. c 2014 Association for Computational Linguistics (Year: 2014).*

(Continued)

*Primary Examiner* — Ashish Thomas
*Assistant Examiner* — Mellissa M. Ohba
(74) *Attorney, Agent, or Firm* — Faegre Drinker Biddle & Reath LLP

(57) ABSTRACT

Systems, methods, and computer-readable media provide entity relation extraction across sentences in a document using distant supervision. A computing device can receive an input, such as a document comprising a plurality of sentences. The computing device can identify syntactic and/or semantic links between words in a sentence and/or between words in different sentences, and extract relationships between entities throughout the document. A knowledge base (e.g., a table, chart, database etc.) of entity relations based on the extracted relationships can be populated. An output of the populated knowledge base can be used by a classifier to identify additional relationships between entities in various documents. Machine learning can be applied to train the classifier to predict relations between entities. The classifier can be trained using known entity relations, syntactic links and/or semantic links.

20 Claims, 5 Drawing Sheets

(51) Int. Cl.
*G06F 40/35* (2020.01)
*G06F 40/295* (2020.01)

(56) References Cited

U.S. PATENT DOCUMENTS

| | | | | |
|---|---|---|---|---|
| 7,454,430 | B1* | 11/2008 | Komissarchik | G06F 17/30719 |
| 7,542,903 | B2* | 6/2009 | Azara | G06F 40/35 704/257 |
| 7,756,807 | B1* | 7/2010 | Komissarchik | G06F 17/30719 706/46 |
| 8,244,661 | B1* | 8/2012 | Komissarchik | G06F 17/30719 706/46 |
| 8,620,848 | B1* | 12/2013 | Komissarchik | G06F 17/30719 706/46 |
| 8,639,678 | B2* | 1/2014 | Somasundaran | G06F 17/30705 707/705 |
| 8,682,674 | B1* | 3/2014 | Komissarchik | G06F 17/30719 704/243 |
| 8,874,432 | B2* | 10/2014 | Qi | G06F 17/271 704/9 |
| 2005/0182618 | A1* | 8/2005 | Azara | G06F 40/35 704/9 |
| 2005/0182619 | A1* | 8/2005 | Azara | G06F 40/35 704/9 |
| 2005/0182625 | A1* | 8/2005 | Azara | G10L 15/22 704/236 |
| 2010/0324927 | A1* | 12/2010 | Tinsley | G06F 19/325 705/2 |
| 2013/0066870 | A1* | 3/2013 | Somasundaran | G06F 17/30705 707/737 |
| 2014/0082003 | A1 | 3/2014 | Feldman et al. | |
| 2015/0066483 | A1* | 3/2015 | Zhang | G06F 17/278 704/9 |
| 2015/0370782 | A1 | 12/2015 | Fan et al. | |

OTHER PUBLICATIONS

Gonzalez, et al., "Unsupervised Relation Extraction by Massive Clustering", In Proceedings of Ninth IEEE International Conference on Data Mining, Dec. 6, 2009, pp. 782-787.

Krause, et al., "Language Resources and Annotation Tools for Cross-Sentence Relation Extraction", In Proceedings of the 9th International Conference on Language Resources and Evaluation, May 26, 2014, pp. 4320-4325.

Kushman, et al., "Learning to Automatically Solve Algebra Word Problems", In Proceedings of the 52nd Annual Meeting of the Association for Computational Linguistics, Jun. 22, 2014, 192 pages.

Lima, et al., "Transforming Graph-based Sentence Representations to Alleviate Overfitting in Relation Extraction", In Proceedings of the ACM symposium on Document engineering, Sep. 16, 2014, pp. 53-62.

Maslennikov, et al., "Combining relations for information extraction from free text", In Journal of ACM Transactions on Information Systems, vol. 28, Issue 3, Jun. 2010, 35 pages.

Min, et al., "Distant Supervision for Relation Extraction with an Incomplete Knowledge Base", In Proceedings of Annual Conference of the North American Chapter of the Association for Computational Linguistics, Jun. 9, 2013, pp. 777-782.

Romero, et al., "An Artificial Immune System Model for Knowledge Extraction and Representation", In Proceedings of IEEE Congress on Evolutionary Computation, Jun. 1, 2008, pp. 3413-3420.

Swampillai, Kumutha, "Information extraction across sentences", In Doctoral dissertation of University of Sheffield, Retrieved on: Apr. 29, 2016, 1 page.

Swampillai, et al., "Inter-sentential Relations in Information Extraction Corpora", In Proceedings of the International Conference on Language Resources and Evaluation, May 23, 2010, pp. 2637-2641.

Yao, et al., "Collective Cross-Document Relation Extraction without Labelled Data", In Proceedings of the Conference on Empirical Methods in Natural Language Processing, Oct. 9, 2010, pp. 1013-1023.

Zhou, et al., "Approaches to Text Mining for Clinical Medical Records", In Proceedings of the ACM symposium on Applied computing, Apr. 23, 2006, pp. 235-239.

* cited by examiner

RELATION EXTRACTION ACROSS SENTENCE BOUNDARIES

BACKGROUND

A vast number of documents are stored in various forms of data stores. The documents can contain copious amounts of data from which a great deal of knowledge can be learned. However, a majority of the documents are stored in an unstructured format, from which it is difficult to extract data. Traditionally, systems use various types of supervised learning to extract structured knowledge, such as a relation between entities, from unstructured text. However, supervised learning can be time consuming and expensive.

Additionally, conventional techniques involve an evaluation of a single sentence in a document to determine the existence of an entity relation, and to subsequently extract the structured knowledge. However, the conventional single sentence approach can be insufficient to identify and extract many of the entity relations in a document. As such, conventional techniques fail to maximize the amount of knowledge that can be gleaned from a document.

SUMMARY

This disclosure describes systems, methods, and computer-readable media for providing entity relation extraction across sentences in a document using distant supervision (e.g., using a trained classifier to identify novel relations between entities). In some configurations, a computing device can receive an input, such as a document comprising a plurality of sentences. The computing device can identify syntactic and/or semantic links between words in a sentence and/or words between sentences, and extract relationships between entities throughout the document based on the links. Techniques and technologies described herein populate a knowledge base (e.g., a table, chart, database, etc.) of entity relations based on the extracted relationships. A populated knowledge base can be used to train a classifier to identify additional relationships between entities in various documents.

Example techniques described herein can apply machine learning to train the classifier to predict relations between entities. The classifier can be trained using known entity relations, syntactic links and/or semantic links.

The above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to systems, methods, computer-readable instructions, modules, algorithms, hardware logic and/or operations as permitted by the context described above and throughout the document. Furthermore, the claimed subject matter is not limited to implementations that solve any or all disadvantages noted in any part of this disclosure. Additionally, the terms "relation extraction," "knowledge base completion," "database completion," and the like, are intended to describe generating structured knowledge from unstructured documents.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
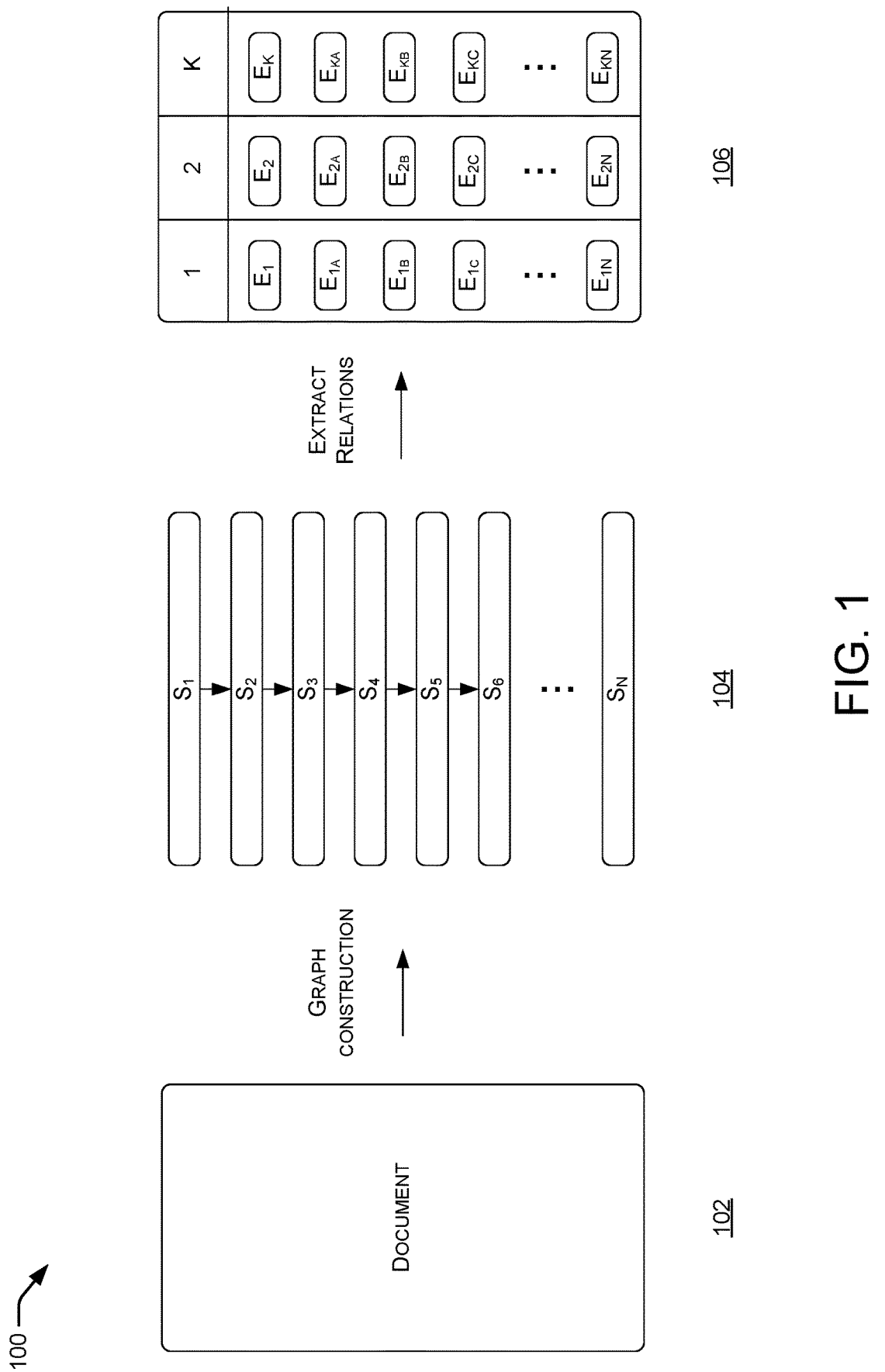
FIG. 1 is a dataflow diagram depicting an example process that a relation extraction framework can perform to determine relationships between entities in a document in a relation extraction system.

The technologies described herein provide techniques and constructs to efficiently extract knowledge from a document (e.g., using a trained classifier to identify a relation between words). In some examples, a computing system can receive a document comprising one or more sentences. The computing system can process each sentence and graph nodes (e.g., words, phrases, characters, etc.) and edges (e.g., dependency links between nodes) in individual sentences and across sentence boundaries.

In various examples, the graphing can include identifying one or more links (e.g., syntactic, semantic, co-reference, discourse, etc.) between nodes in the document. The links can include intra-sentence and inter-sentence links between nodes. For example, a link can represent a relationship between the root of one sentence and the root of an adjacent sentence. For another example, a link can represent a relationship between two words in a sentence, such as the modifier "cancer" to the word "cells."

In various examples, after the links are identified, the computing system can extract the entity relations and populate a knowledge base (e.g., a structured language table) of entity relations. The computing system can then use the structured language table of entity relations to provide computer-aided support in various realms. For instance, the computing system can receive a plurality of documents related to the treatment of certain type of cancer, determine the relations between the type of cancer and treatment options, and populate a table with the relations. The computing system can later receive a query from a medical doctor related to the cancer, and can provide the medical doctor with treatment options based on the populated table of data.

Additionally, the computing system can apply machine learning to train a classifier to identify entity relations in a document using distant supervision. The computing system can receive one or more documents with known entity relations, and can train the classifier to identify the entity relations based on relationships between sentences and/or sub-sentential clauses in the document (e.g., co-reference relationships, discourse structure, relevant entities, etc.). The computing system can then apply the classifier to other documents to find unknown entity relations. For example, the classifier can use the known relevant relationships between a particular type of cancer and a genetic mutation associated with the cancer, and can apply the relevant relationships to other documents to identify genetic links to other types of cancer.

These and various other example features will be apparent from a reading of the following description and a review of the associated drawings. However, the claimed subject matter is not limited to implementations that solve any or all disadvantages or provide any of the benefits noted in any part of this disclosure.

Illustrative Environment

The environment described below constitutes but one example and is not intended to limit the claims to any one particular operating environment. Other environments can be used without departing from the spirit and scope of the claimed subject matter.

FIG. 1 is a dataflow diagram depicting an example process 100 that a relation extraction framework can perform to determine relationships between entities in a document in a relation extraction system.

At 102, a computing system can input or otherwise identify a document to be processed. In various examples, the document can be unstructured data, such as natural language text. The document can include text in sentence format and/or paragraph format. For example, the computing system can identify an article from a news source with a plurality of paragraphs and sentences.

At 104, the computing system can process each sentence $S_1$-$S_N$ in the document, and identify nodes (e.g., words, phrases, characters, etc.)) and edges (e.g., dependency links between nodes) in each of the sentences. In various examples, the nodes can be labeled with its lexical item (e.g., basic element of the word), lemma (e.g., citation form of the word) and part-of-speech (e.g., noun, verb, adjective, adverb, pronoun, etc.). As will be described in greater detail below with regard to FIG. 2, the computing system can identify intra-sentential and inter-sentential edges between the nodes, such as dependencies, adjacencies, and discourse relations. For example, the computing system can determine that a subject/object dependency exists in a single sentence. For another example, the computing system can identify that the roots of adjacent sentences depend on one another.

In various examples, the computing system can construct a graph of the intra-sentential and the inter-sentential dependencies. The graph can include one or more links between dependent words in a sentence, one or more links between dependent words in adjacent sentences, and/or one or more links between dependent words in non-adjacent sentences. In various examples, the one or more links can include co-reference links within a sentence and/or between adjacent sentences. Co-reference links can be links between words in the text that refer to the same thing. In some examples, the computing device can apply a rule for resolving demonstrative references to generate a co-reference. In such examples, the computing system can identify that a noun is preceded by a demonstrative (e.g., this trial), and can link the demonstrative to the closest prior noun phrase with the same head (e.g., a recent phase III trial).

In various examples, the computing system can identify one or more discourse links within the document. The discourse links can represent formal relationships between words in sentences and/or sub sentential clauses. The discourse links can be within a sentence and/or between sentences in the document. Examples of discourse links can include, but are not limited to elaborations, contrast, and the like.

Additionally, the computing system can identify relevant entities in each of the sentences of the document. The relevant entities can include the subject of a sentence, the object of the sentence, the root of the sentence, and the like.

At 106, the computing system can identify relations between entities in the document, extract the entity relations, and populate a table of entity relations. The computing system can apply a classifier to identify relations between entities. The classifier can include a baseline knowledge base (e.g., database) of related entities and/or known syntactic and/or semantic relationships between the related entities. For example, the classifier can identify a relationship between a type of cancer and a genetic mutation based on the match of a link between relevant entities in the document and a pair or related entities highlighting the type of cancer and the genetic mutation in the knowledge base. For another example, the classifier can identify an unknown relationship between another type of cancer and another genetic mutation based on known syntactic and/or semantic relationships between the known related entities.

In various examples, the classifier can include a trained model capable of identifying relations based on one or more links (e.g., dependency paths) to each of the relevant entities in the document. In such examples, the one or more links can be inter-sentential and/or intra-sentential. For example, a relevant entity in a first sentence may be linked via a particular co-reference link to a relevant entity in a second sentence. Based on the particular co-reference link, the classifier can determine that the two relevant entities are related.

In various examples, the classifier can evaluate the one or more links, and identify a shortest distance path (e.g., a sequence of nodes and edges $n_1, e_1, n_2 \ldots, e_{L-1}, n_L$) between relevant entities. In some examples, the classifier can identify N shortest distance paths between the relevant entities. The shortest distance paths can be inter-sentential and/or intra-sentential. In various examples, the edges related to the shortest distance paths between entities can be weighted equally in a classifier algorithm. In other examples, the edges can be assigned various weights based at least in part on known relationships of import between the relevant entities and the edges. For example, two relevant entities can be located in separate sentences. A shortest path between the two relevant entities can include two discourse links to a root word in the first sentence. The classifier can assign a higher weight to the path based on the root word being the edge feature linking the two relevant entities.

In various examples, the classifier can explore whole path features to determine a relation between entities. In such examples, the classifier can extract binary indicator features for each shortest distance path. The binary indicator features can include one or more of the lexical item, lemma, part-of-speech tag, or nothing. The classifier can then use the binary indicator features to determine a weight for the particular path.

In some examples, the classifier can explore path n-gram features to determine a relation between entities. In such examples, the classifier can consider a sliding window along each path. For each position i, the classifier can extract n-gram features starting at each node ($n_i$, then $n_i \cdot e_i$ and so on until $n_i \cdot e_i \cdot n_{i+1} \cdot e_{i+1} \cdot n_{i+2}$) and each edge ($e_i$ up to $e_i \cdot n_{i+1} \cdot e_{i+1} \cdot n_{i+2} \cdot e_{i+2}$). Each node can be represented by its lexical item, lemma, or part-of-speech. Edges can be represented by a label. Based on the feature templates determined by using the path n-gram features, the classifier can predict a relation between relevant entities.

Based upon a prediction of a relation between relevant entities, the classifier can extract the related entities ($E_1$, $E_2$, $E_K$-$E_{1N}$, $E_{2N}$, $E_{KN}$) from the document, and populate the knowledge base. The knowledge base can include two or more labeled columns. The labels can include a description of the relevant entity to be populated in the respective column. Although the knowledge base is illustrated as a three-column table, the knowledge base can include a table with a greater or fewer number of columns. For example, a gene drug knowledge base can include seven columns representing diseases, genes, variants, descriptions, effects, associations and therapeutic contexts. For another example, a knowledge base of famous people involved in romantic relationships can include two columns with each column representing one of the two famous people involved in the romantic relationship.

Figure 2:
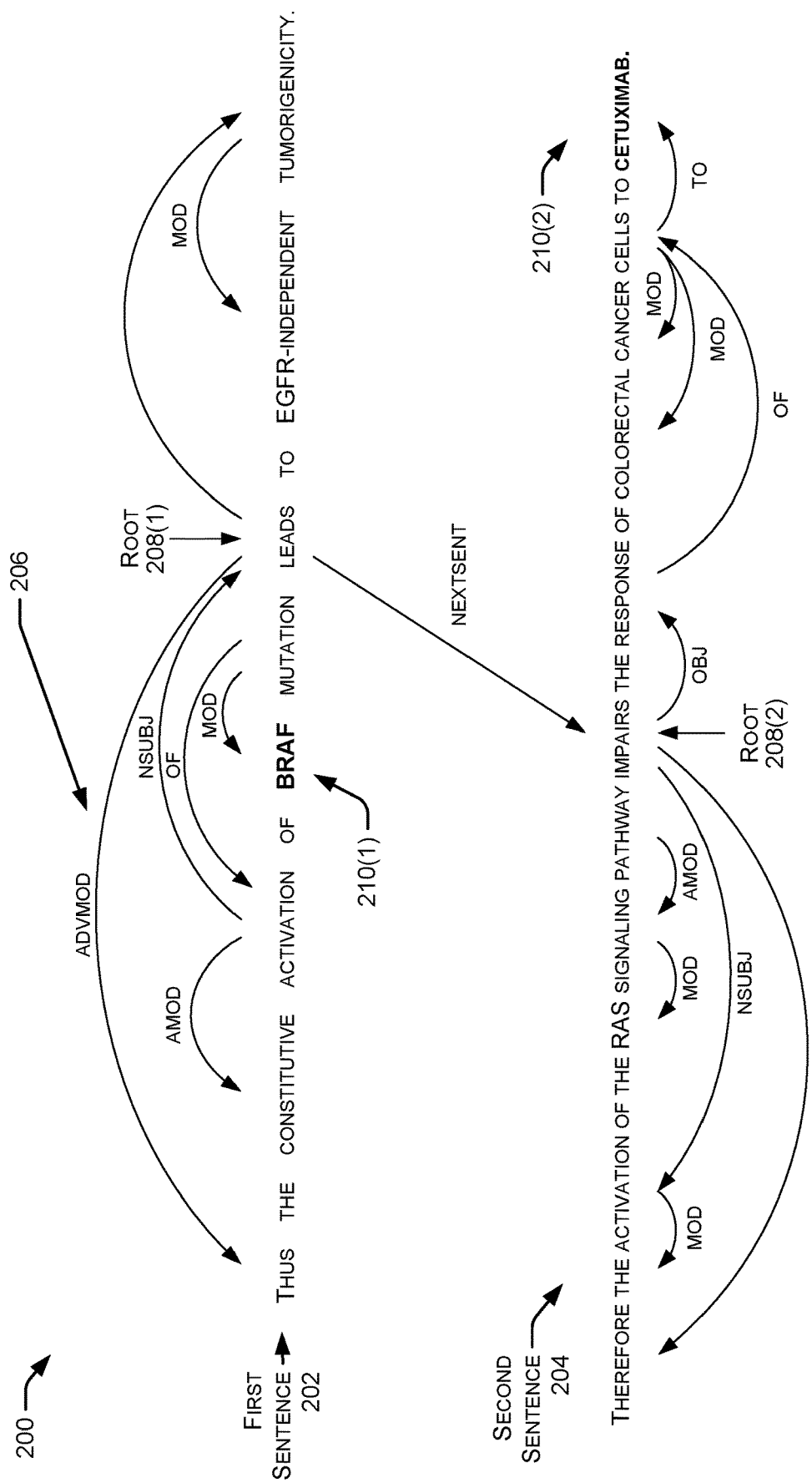
FIG. 2 is a block diagram depicting an example graph of a first sentence and a second sentence in a relation extraction system.

FIG. 2 is a block diagram depicting an example graph 200 of a first sentence 202 and a second sentence 204 in a relation extraction system. The graph 200 can represent one or more links between nodes in a sentence and between nodes in different sentences. The first sentence 202 and second sentence 204 can be sentences in a document, each of the sentences can include one or more words in natural language text. In the illustrated example, the first sentence 202 and the second sentence 204 are adjacent sentences derived from an article describing a link between a human gene and a type cancer. Other examples can include news articles, essays, books, or other type of text provided in a natural language format.

The computing system can input the document and identify nodes (e.g., words, phrases, characters, etc.) and edges (e.g., dependency links between nodes) in each of the sentences. In some examples, the nodes can be labeled with its lexical item, lemma, and/or part-of-speech. The edges can be labeled with the particular dependency link identified between the nodes. For example, edge 206 identifies the word "thus" as an adverb modifier of the root word "leads." Based on the identification, the computing system can label edge 206 "ADVMOD." FIG. 2 depicts the edges and labels of various other examples in the first sentence 202 and second sentence 204, such as advanced modifier links, modifier links, next subject links, object links, links of one node to another, sympathetic links (e.g., response of one node to another). However, these are merely examples, and the computing system can identify and label more edges in the sentences, such as discourse links (e.g., elaborations, contrasts, etc.), co-reference links (e.g., two or more nodes that refer to one another).

Additionally, the computing system can identify and label inter-sentential edges. In the illustrative example, the first sentence 202 is linked to the second sentence 204 via a next sentence link between root words 208(1) and 208(2). In other examples, the graph 200 can include a larger number of inter-sentential edges. For example, the graph 200 can include an elaboration link, identifying a node in the second sentence 204 as an elaboration on a node in the first sentence 202. For another example, the graph 200 can include a co-reference link, identifying nodes in respective sentences as referring to one another.

In various examples, the computing system can identify relevant entities in the sentences of a document. In the illustrative example, the first sentence 202 and the second sentence 204 each have one relevant entity 210(1) and 210(2), respectively. In some examples, the sentences 202 and/or 204 can include a larger number of relevant entities 210. In some examples, the sentences 202 and/or 204 can be devoid of a relevant entity 210.

After the computing system identifies the links and/or identifies relevant entities in the document, the computing system can apply a classifier to identify relations between the relevant entities. The classifier can include a baseline knowledge base (e.g., database) of related entities and/or known syntactic and/or semantic relationships (e.g., links, paths, etc.) between the related entities. In various examples, the classifier can identify known entity relations in a document. In such examples, the known entity relations can be previously saved in the knowledge base. For example, the classifier can identify that a document includes the related entities of colorectal cancer and the human gene BRAF. Based on an entity relation in the knowledge base between colorectal cancer and BRAF, the classifier can identify that the relevant entities in the document are related.

In some examples, the classifier can include a trained model capable of identifying unknown relations between entities in a document. In such examples, the classifier can identify one or more links (e.g., dependency paths) between relevant entities that are known to result in entity relation. For example, the classifier can identify an unknown relationship between a different type of cancer and a different gene based on known syntactic and/or semantic relationships between the known related entities, such as colorectal cancer and BRAF. The one or more links can be inter-sentential and/or intra-sentential. For example, a relevant entity in a first sentence may be linked via a particular co-reference link to a relevant entity in a second sentence. Based on the particular co-reference link, the classifier can determine that the two relevant entities are related.

In various examples, the classifier can evaluate the one or more links, and can identify one or more paths between the identified relevant entities and/or root words. The one or more paths can be inter-sentential and/or intra-sentential (e.g., if two or more relevant entities existing in one sentence). The one or more paths can flow forward (e.g., direction of dependency depicted by an arrow), or backward (e.g., opposite the direction of dependency). Each path can include one or more links. As illustrated in FIG. 2, a link between the relevant entity 210(1) in first sentence 202 and the relevant entity 210(2) in the second sentence 204 can include a modifier link (MOD), a sympathetic link (OF), a next subject link (NSUBJ), a next sentence link (NEXT-SENT), an object link (OBJ), a second sympathetic link (OF), and a link to the relevant entity 210(2) (TO).

In some examples, based on an identification of one or more known (e.g., trained) paths between relevant entities, the classifier can identify the relevant entities as being related. The classifier can then extract the related entities, and populate the knowledge base with the newly identified relationship between entities.

In various examples, the classifier can evaluate the one or more links, and identify a shortest distance path (e.g., a sequence of nodes and edges $n_1, e_1, n_2 \ldots, e_{L-1}, n_L$) between relevant entities. In some examples, the classifier can identify N shortest distance paths between the relevant entities. The shortest distance paths can be inter-sentential and/or intra-sentential.

In various examples, the edges related to the shortest distance paths between entities can be weighted equally in a classifier algorithm. In other examples, edges can be assigned various weights based at least in part on known relationships of import between the relevant entities and the edges. For example, two relevant entities can be located in separate sentences. A shortest path between the two relevant entities can include two discourse links to a root word in the first sentence. The classifier can assign a higher weight to the path based on the root word being the edge feature linking the two relevant entities.

In some examples, based on the identified N shortest paths between relevant entities, the classifier can identify the relevant entities as being related. The classifier can then extract the related entities, and update the knowledge base with the newly identified relationship between entities. The classifier can then use the updated knowledge base to identify and extract entity relations from a plurality of other documents.

Figure 3:
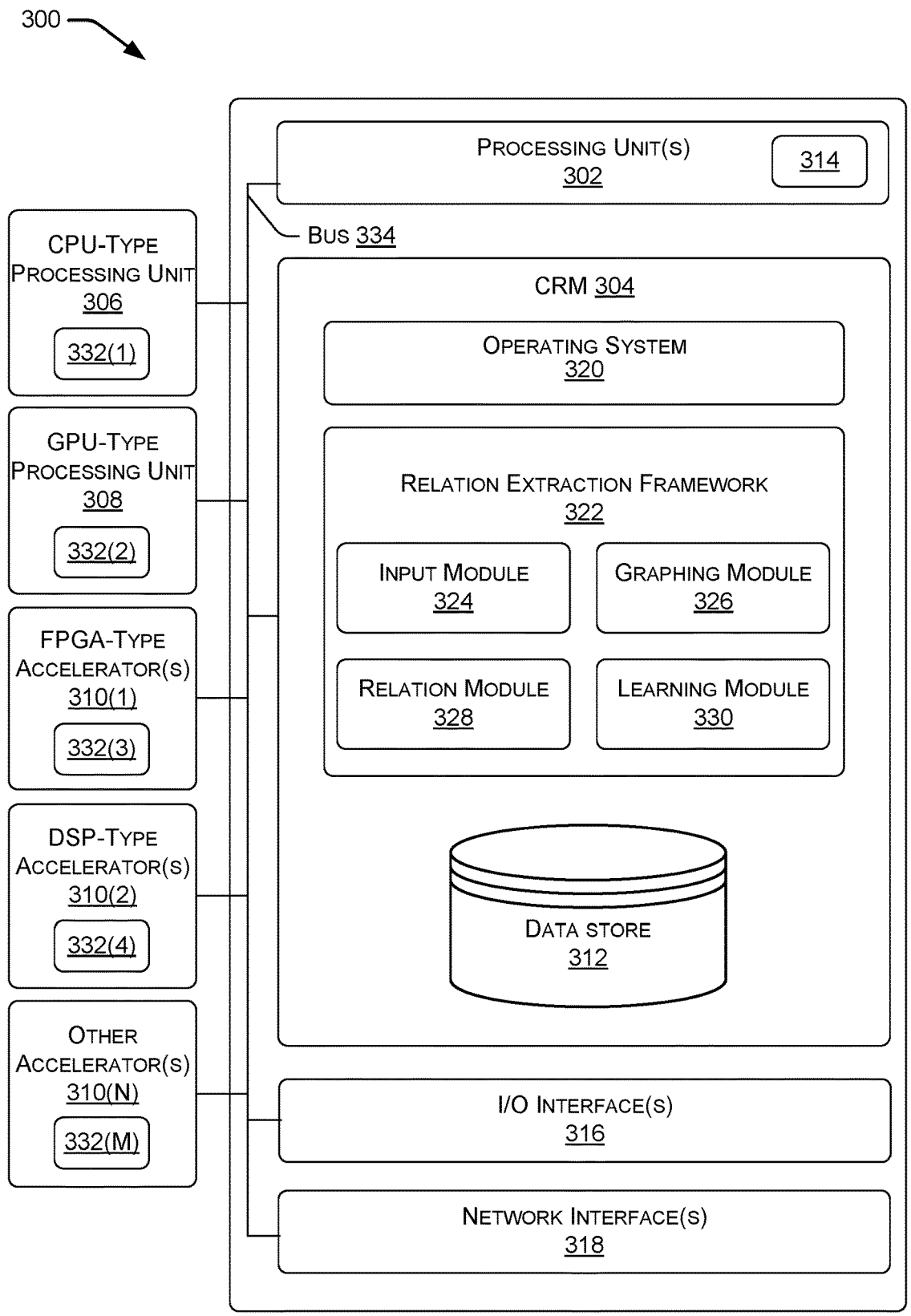
FIG. 3 is a block diagram depicting an example computing device configured to participate in a relation extraction system.

FIG. 3 is a block diagram depicting an example computing device 300 configured to participate in a relation extraction system described in FIGS. 1 and 2. The computing device 300 can belong to any category or class of devices, such as a desktop computer-type device, a mobile device, a traditional consumer-type device, and/or a special purpose-type device. In some examples, the computing device 300 can be one of many devices connected and operating together in a distributed computing resource. Computing device 300 can include, but is not limited to, a server computer or a blade server such as a Web server, a map/reduce server or other computation engine, a desktop computer, a laptop computer, a thin client, a terminal, or another mobile computer, a tablet or tablet hybrid computer, a smartphone, a mobile phone, a mobile phone-tablet hybrid device, or other telecommunication device, or integrated components for inclusion in computing devices configured to participate in or carry out entity relation extraction from unstructured documents.

In computing device 300, processing unit(s) 302 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

The computing device 300 can include computer-readable media (CRM) 304. CRM described herein, e.g., CRM 304, includes computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106 or consumer computing device 124.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, CRM 304 can store instructions executable by the processing unit(s) 302, which as discussed above, can represent a processing unit incorporated in device 300. CRM 304 can also store instructions executable by external processing units such as by an external CPU-type processing unit 306, an external GPU-type processing unit 308, and/or executable by an external accelerator 310, such as an FPGA-type accelerator 310(1), a DSP-type accelerator 310(2), or other type of accelerator 310(N). In various examples at least one CPU-type processing unit, GPU-type processing unit, and/or accelerator is incorporated in the computing device 300, while in some examples one or more of a CPU-type processing unit, GPU-type processing unit, and/or accelerator is external to the computing device 300.

In the illustrated example, CRM 304 can also include a data store 312. In some examples, data store 312 can include data storage such as a database, data warehouse, or other type of structured or unstructured data storage. In some examples, data store 312 can include a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 312 can store data and/or instructions for the operations of processes, applications, components, and/or modules stored in CRM 304 and/or executed by processing unit(s) 302. Alternately, some or all of the above-referenced data and/or instructions can be stored on separate memories 314 on board one or more processing unit(s) 302 such as a memory on board a CPU-type processor, a GPU-type processor, an FPGA-type accelerator, a DSP-type accelerator, and/or another accelerator.

Device(s) 300 can further include one or more input/output (I/O) interfaces 316 to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

In addition, in device(s) 300, network interface(s) 318 can represent, for example, network interface controllers (NICs) or other types of transceiver devices to send and receive communications over a network. For example, the network can include public networks such as the Internet, private networks such as an institutional and/or personal intranet, or some combination of private and public networks. The network can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. As such, the network interface(s) 318 can include a number of devices that facilitate network communications and/or form a hardware basis for the networks, such as switches, routers, gateways, access points, firewalls, base stations, repeaters, backbone devices, and the like.

The network interface(s) 318 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In the illustrated example, CRM 304 also includes an operating system 320 and a relation extraction framework 322. The relation extraction framework 322 can include one or more modules and/or APIs, which are illustrated as blocks 324, 326, 328 and 330, although this is just an example, and the number can vary higher or lower.

Functionality described associated with blocks 324, 326, 328 and 330 can be combined to be performed by a fewer number of modules and/or APIs or it can be split and performed by a larger number of modules and/or APIs. For example, block 324 can represent an input module with logic to program processing unit 302 of device 300 to deliver one or more documents to the relation extraction framework 322 for processing. The input module can receive documents from the data store 312, from an external data store, and/or from an external source, such as via the network interface(s) 318.

Block 326 can represent a graphing module with logic to program processing unit 202 to process sentences of a document and identify intra-sentential and inter-sentential relationships. In various examples, the graphing module can process sentences of the document sequentially. In other examples, the graphing module can process sentences of the document in another order, such as in reverse order. The graphing module can identify nodes (e.g., words, phrases, characters, etc.) and edges (e.g., dependency links between nodes) in each of the sentences. In various examples, the graphing module can label the nodes with a respective lexical item (e.g., basic element of the word), lemma (e.g., citation form of the word) and/or part-of-speech (e.g., noun, verb, adjective, adverb, pronoun, etc.). In some examples, the graphing module can identify and/or label the intra-sentential and inter-sentential edges between the nodes, such as dependencies, adjacencies, and discourse relations.

In various examples, the graphing module can construct a graph based on the intra-sentential and inter-sentential dependencies, such as graph 200 of FIG. 2. The graph can include one or more links between dependent words in a sentence, one or more links between dependent words in adjacent sentences, and/or one or more links between dependent words in non-adjacent sentences. In various examples, the one or more links can include co-reference links within a sentence and/or between different sentences in the document (e.g., adjacent or non-adjacent). Co-reference links can be links between words in the text that refer to the same thing. In some examples, the graphing module can apply a rule for resolving demonstrative references to generate a co-reference. In such examples, the graphing module can identify that a noun is preceded by a demonstrative (e.g., this trial), and can link the demonstrative to the closest prior noun phrase with the same head (e.g., a recent phase III trial).

In various examples, the one or more links can include discourse links within a sentence and/or between different sentences of a document. Discourse links can be formal relationships between words, such as elaborations, contrasts, and the like. In some examples, the graphing module can apply discourse representation theory to identify the one or more discourse links within the document.

Additionally, the graphing module can identify and label relevant entities in the document. The relevant entities can include the subject of a sentence, the object of the sentence, the root of the sentence, and the like. In some examples, each sentence of a document can include one or more relevant entities. In other examples, some sentences can include one or more relevant entities, while other sentences do not include a relevant entity.

Block 328 can represent a relation module with logic to program processing unit 302 to identify relations between entities in the document. The relation module can apply a trained classifier to the one or more links of the graph and identify related entities in the document. The classifier can include a baseline knowledge base (e.g., database) of related entities and/or known syntactic and/or semantic relationships (e.g., links, dependencies, adjacencies, etc.) between the related entities. The syntactic and/or semantic relationships can be inter-sentence and/or intra-sentence relationships.

In various examples, the relation module can identify the existence of known related entities in the document. In such examples, the relation module can identify relevant entities in the document, and can identify the same relevant entities as related in the knowledge base.

Additionally or alternatively, the relation module can identify a relation based on one or more links (e.g., dependency paths) to each of the relevant entities in the document. In such examples, the one or more links can be inter-sentential and/or intra-sentential. For example, a relevant entity in a first sentence may be linked via a particular co-reference link to a relevant entity in a second sentence. Based on the particular co-reference link, the classifier can determine that the two relevant entities are related.

The relation module can evaluate the one or more links, and can identify one or more paths between the identified relevant entities and/or root words. The one or more paths can be inter-sentential and/or intra-sentential (e.g., if two or more relevant entities existing in one sentence). The one or more paths can flow forward (e.g., direction of dependency depicted by an arrow), or backward (e.g., opposite the direction of dependency). Based on an identification of one or more known (e.g., trained) paths between relevant entities, the relation module can identify the relevant entities as being related. The relation module can then extract the related entities, and populate the knowledge base with the newly identified relationship between entities.

In various examples, the relation module can identify the one or more paths, and can assign weights to each of the paths. The weights can be based on the specific links, the number of links, the sequence of links, the intra-sentential and/or inter-sentential nature of the links, and/or relevant entities. In some examples, the relation module can apply the weights to an algorithm to determine whether the relevant entities are related. In various examples, the relation module will select N shortest paths between relevant entities for evaluation. In such examples, based on the identified N shortest paths and/or the weights thereof, the relation module can determine whether the relevant entities are related.

Block 330 can represent a machine learning module configured to use machine learning techniques to train a classifier to identify related entities in a document. The term "machine learning" may refer to one or more programs that learns from the data it receives. For example, a machine learning mechanism may build, modify or otherwise utilize a model that is created from example inputs, and the machine learning mechanism can make predictions or decisions using the model. In the current example, machine learning can be used to improve the identification and extraction of related entities in a document. The model may be trained using directly supervised learning or distant supervision.

The machine learning module can include logic to program processing unit 302 for extraction of training documents with known entity relations and/or intra-sentential and/or inter-sentential dependencies. In some examples, the training documents may be stored on computing device 300, such as, for example, in data store 312. In some examples, the training documents can be extracted or received from a remote computing device, such as via the network interface(s) 318, and stored in data store 312. The training module can access the training documents, and can train the classifier to predict one or more known related entities in the document. In some examples, the training module can also train the classifier to identify one or more intra-sentential dependencies, inter-sentential dependencies, and/or paths (e.g., multiple dependencies) between known related entities.

In various examples, the machine learning module can train the classifier periodically, such as, for example, at a specified time each day. In some examples, the periodic interval can be determined by a program manager (e.g., monthly, weekly, daily). In some examples, the machine learning module can obtain or access training documents when manually directed by the program manager.

Alternatively, some or all of the above-referenced data can be stored on separate memories 332, such as memory 332(1) on board a CPU-type processing unit 306, memory 332(2) on board a GPU-type processing unit 308, memory 332(3) on board an FPGA-type accelerator 310(1), memory 332(4) on board a DSP-type accelerator 310(2), and/or memory 332(M) on board another accelerator 310(N).

Bus 334 can operably connect CRM 304 to processing unit(s) 302. The bus 334 can include one or more of a system bus, a data bus, an address bus, a PCI bus, a Mini-PCI bus, and any variety of local, peripheral, and/or independent buses.

Illustrative Processes

Figure 4:
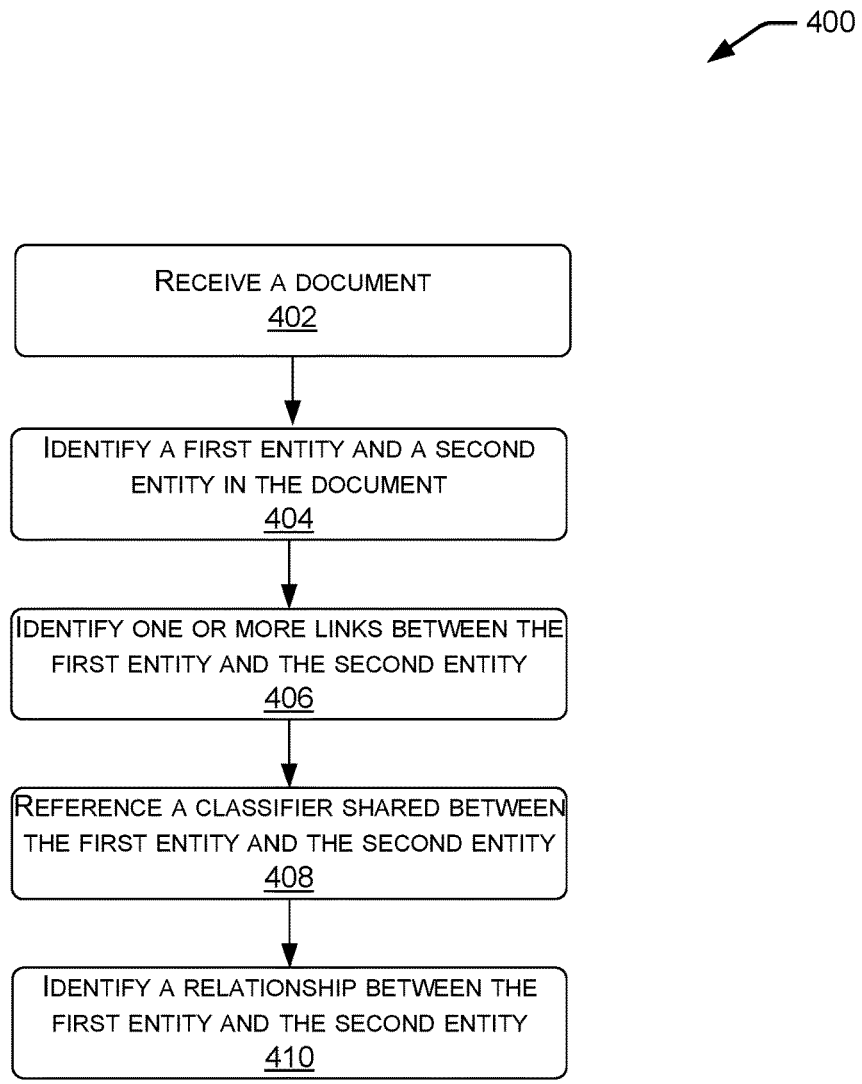
FIG. 4 is a flow diagram that illustrates an example process flow of identifying and extracting an entity relation from a document.
Figure 5:
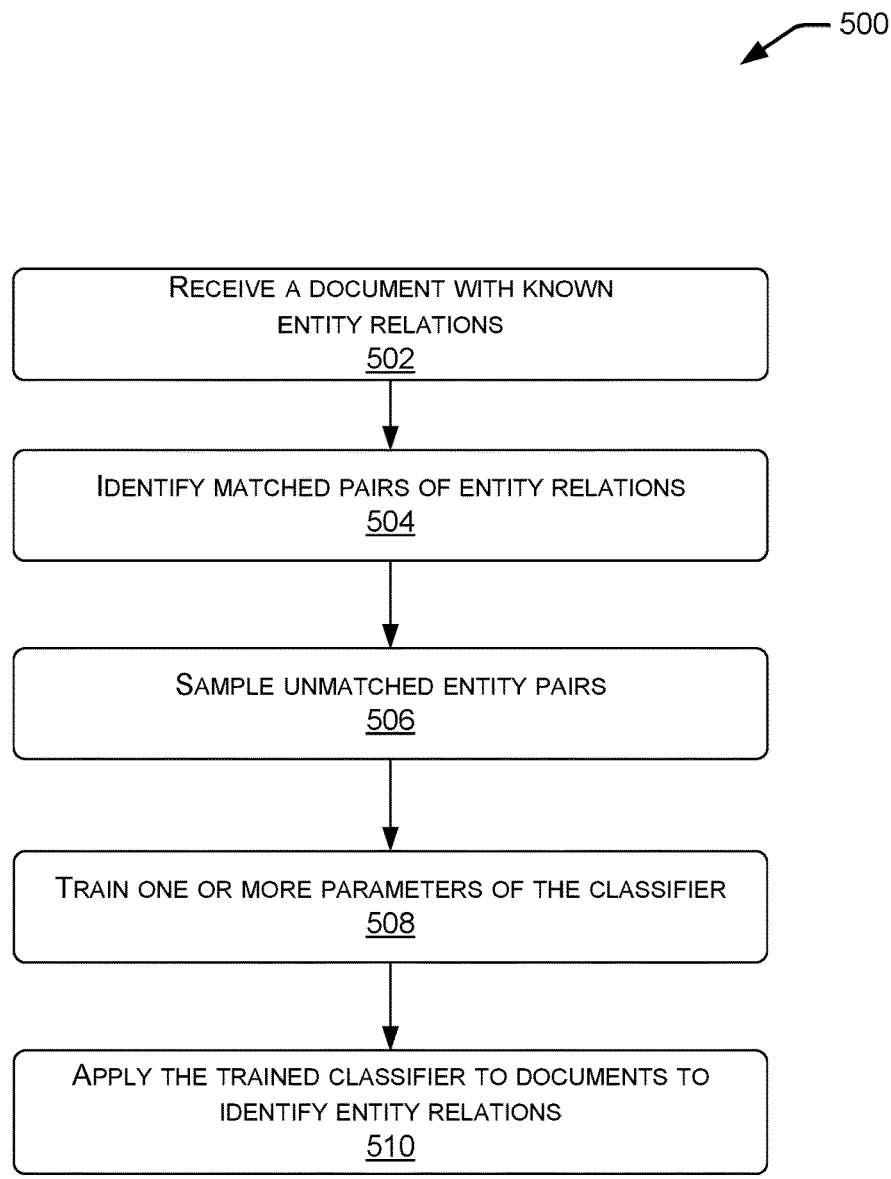
FIG. 5 is a flow diagram that illustrates an example process flow of training a classifier to identify an entity relation in a document.

FIGS. 4 and 5 are flow diagrams depicting example processes for an entity relation extraction and training an entity relation extraction system, respectively. The operations of the example process are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

FIG. 4 is a flow diagram that illustrates an example process flow of identifying and extracting an entity relation from a document.

At block 402, a computing system can receive a document. In various examples, the document can be unstructured data, such as natural language text. The document can include text in sentence format and/or paragraph format. For example, the computing system can input an article from a news source with a plurality of paragraphs and sentences. For another example, the computing system can input a novel with a plurality of chapters, paragraphs, and sentences.

At block 404, the computing system can identify a first entity in a first sentence and a second entity in a second sentence in the document. The first and second entities can include relevant entities recognized by the computing system. The first and the second entities can be the subject, the object, the root, or other focal point of the sentence.

At 406, the computing system can identify one or more links between the first entity and the second entity. The computing system can first identify nodes and edges in each of the sentences. In various examples, each node can be labeled with its lexical item, lemma and part-of-speech. The computing system can identify intra-sentential and inter-sentential edges between the nodes, such as dependencies, adjacencies, and discourse relations. For example, the computing system can determine that a subject/object dependency exists in a single sentence. For another example, the computing system can identify that the roots of adjacent sentences depend on one another.

In some examples, the computing system can generate a graph based upon the intra-sentential and inter-sentential dependencies. The graph can include one or more links between dependent words in a sentence and/or one or more links between dependent words in adjacent sentences. In various examples, the one or more links can include co-reference links within a sentence and/or between sentences (e.g., adjacent and/or non-adjacent). Co-reference links can be links between words in the text that refer to the same thing. In some examples, the one or more links can include discourse links within a sentence and/or between sentences. Discourse links can represent formal relationships between words, such as elaborations, contrasts, and the like.

Based at least in part on the identified edges and nodes, the computing system can identify one or more links between the first entity and the second entity. In some examples, the computing system can identify more than one path between the first entity and the second entity. In such examples, a first series of links may include a first path between the first entity and the second entity, while a second series of links may include a second path between the first entity and the second entity.

At block 408, the computing system can reference a classifier shared between the first entity and the second entity. The classifier can be a trained model configured to predict one or more related entities in the document. The classifier can evaluate the one or more links, and identify one or more paths between relevant entities. Each path can include a series of links between nodes on the graph. In some examples, the classifier can identify links that populate forward in a sequential manner based on a sentence order (e.g., from a relevant entity in a first sentence to a relevant entity in a second sentence). In some examples, the classifier can identify links that populate backward in a reverse sentence order (e.g., from a relevant entity in a second sentence to a relevant entity in a first sentence). In various examples, the classifier can evaluate the one or more links and identify N shortest paths between relevant entities.

At block 410, the computing system can identify a relationship between a first entity and a second entity. The first entity and the second entity can be among the identified relevant entities. In various examples, the relationship can be identified based on a knowledge base. In such examples, the first entity and the second entity can be listed as related entities in the knowledge base. Based on the known relation, the computing system can identify that the first entity and the second entity are related.

In some examples, the relationship can be identified based on one or more known paths (e.g., known sequences of links) between the first entity and the second entity. In such examples, the paths can be saved in the knowledge base. The computing system can evaluate the one or more link, and can recognize the one or more known paths of links between the first entity and the second entity. Based on the one or more known paths, the computing system can identify the relationship between the first and the second entities.

In various examples, based on the identification of the relationship, the computing system can extract the relationship between the first entity and the second entity, and can store the relationship in the knowledge base and/or other structured database. The computing system can subsequently apply the newly defined relationship to other documents processed through the relation extraction system.

FIG. 5 is a flow diagram that illustrates a process flow of training a classifier to identify an entity relation in a document.

At block 502, the computing system can receive a document with known entity relations. The document can be a training document. In some examples, the document can also include known inter-sentential and intra-sentential dependencies between the known entity relations. In various examples, the document can include a known number of entity relations.

At block 504, the computing system can identify matched pairs of entity relations. The matched pairs of entity relations can be identified by the computing system as positive training examples.

At block 506, the computing system can sample unmatched entity pairs. In various examples, the unmatched entity pairs can be randomly sampled entities that are not matched as related at block 504. The unmatched entity pairs can be treated as negative training examples.

At block 508, the computing system can train one or more parameters of the classifier based on the positive training examples and negative training examples identified and/or sampled at blocks 504 and 506. The training can include adjustments to the one or more parameters to assist the classifier in identifying the known entity relations.

At block 510, the computing system can apply the trained classifier to other documents to identify and/or predict entity relations.

Example Clauses

A: A system comprising: one or more processors; a computer-readable media including instructions for a relation extraction framework, that, when executed by the one or more processors, cause the relation extraction framework to perform operations comprising: processing at least two sentences of a document; determining an inter-sentential path between a first entity in a first sentence of the at least two sentences and a second entity in a second sentence of the at least two sentences; applying a classifier to the inter-sentential path; and identifying, by the classifier, a relation between the first entity and the second entity.

B: The system as paragraph A recites, the operations further comprising: receiving a training document comprising at least two related entities; and training one or more parameters of the classifier to identify a relation between the at least two related entities.

C: The system as either of paragraph A or B recite, the operations further comprising: identifying a path between the at least two related entities; training the one or more parameters to identify the path linking the at least two related entities; receiving a second training document comprising the path; and identifying a relation between a first related entity at the beginning of the path and a second related entity at the end of the path.

D: The system as any of paragraph A-C recite, wherein the determining the inter-sentential path between the first entity and the second entity further comprises: identifying a plurality of nodes in the document; identifying a plurality of edges in the document, wherein an edge comprises a dependency link between two nodes of the plurality of nodes; and combining two or more edges between the first entity and the second entity.

E: The system as paragraph D recites, wherein the dependency link comprises one or more of: a discourse link; an adjacency link; or a co-reference link.

F: The system as any of paragraph A-E recite, wherein the first sentence and the second sentence are adjacent sentences in the document.

G: The system as any of paragraph A-F recite, wherein the classifier identifies the relation between the first entity and the second entity based at least in part on one or more links of the inter-sentential path.

H: The system as any of paragraph A-G recite, wherein the classifier references a knowledge base to identify the relation between the first entity and the second entity.

I: A computer readable medium having thereon computer-executable instructions, the computer-executable instructions responsive to execution configuring a device to perform operations comprising the steps as recited in paragraphs A-H.

J: A computer-implemented method, comprising: receiving a document comprising two or more sentences; identifying a first entity in a first sentence and a second entity in a second sentence; identifying one or more links between the first entity and the second entity; reference a classifier shared between the first entity and the second entity; and identifying a relationship between the first entity and the second entity based at least in part on the classifier.

K: The method as paragraph K recites, further comprising storing the relationship between the first entity and the second entity in a knowledge base.

L: The method as either of paragraphs J or K recite, wherein the identifying the one or more links comprises: identifying a plurality of nodes in the document; and identifying a plurality of edges in the document, wherein an edge comprises a dependency link between two nodes of the plurality of nodes.

M: The method as any of paragraphs J-L recite, wherein the dependency link comprises an inter-sentential link or an intra-sentential link.

N: The method as any of paragraphs J-L recite, wherein the dependency link comprises at least one of: a discourse link; an adjacency link; or a co-reference link.

O: The method as any of paragraphs J-N recite, further comprising: receiving a training document comprising at least two related entities; and training one or more parameters of the classifier to identify the relationship between the at least two related entities.

P: The method as paragraph O recites, further comprising: identifying a path between the at least two related entities; training the one or more parameters to identify the path linking the at least two related entities; receiving a second training document comprising the path; and identifying a relation between a first related entity at the beginning of the path and a second related entity at the end of the path.

Q: A computer readable medium having thereon computer-executable instructions, the computer-executable instructions responsive to execution configuring a device to perform operations comprising the steps as recited in any of paragraphs J-P.

R: A system comprising one or more processors; a computer-readable media including instructions for a relation extraction framework, that, when executed by the one or more processors, cause the relation extraction framework to perform operations recited in any of paragraphs J-P.

S: A computer-readable medium having thereon computer-executable instructions, the computer-executable instructions responsive to execution configuring a device to perform operations comprising: receiving a document comprising two or more sentences; identifying a first entity in a first sentence and a second entity in a second sentence; identifying one or more links between the first entity and the second entity; referencing a classifier shared between the first entity and the second entity; and identifying a relationship between the first entity and the second entity based at least in part on the classifier.

T: A computer-readable medium as paragraph S recites, further comprising storing the relationship between the first entity and the second entity in a knowledge base.

U: A computer-readable medium as either of paragraphs S or T recite, wherein the identifying the one or more links comprises: identifying a plurality of nodes in the document; and identifying a plurality of edges in the document, wherein an edge comprises a dependency link between two nodes of the plurality of nodes.

V: A computer-readable medium as any of paragraphs S-U recite, further comprising: receiving a training document comprising at least two related entities; and training one or more parameters of the classifier to identify the relationship between the at least two related entities.

W: A computer-readable medium any of paragraphs S-U recite, further comprising: identifying a path between the at least two related entities; training the one or more parameters to identify the path linking the at least two related entities; receiving a second training document comprising the path; and identifying a relation between a first related entity at the beginning of the path and a second related entity at the end of the path.

X: A device comprising: one or more processors; a computer-readable media including instructions for a relation extraction framework, that, when executed by the one or more processors, cause the relation extraction framework to perform operations comprising: processing at least two sentences of a document; determining an inter-sentential path between a first entity in a first sentence of the at least two sentences and a second entity in a second sentence of the at least two sentences; applying a classifier to the inter-sentential path; and identifying, by the classifier, a relation between the first entity and the second entity.

Y: The system as paragraph X recites, the operations further comprising: receiving a training document comprising at least two related entities; and training one or more parameters of the classifier to identify a relation between the at least two related entities.

Z: The system as either of paragraph X or Y recite, the operations further comprising: identifying a path between the at least two related entities; training the one or more parameters to identify the path linking the at least two related entities; receiving a second training document comprising the path; and identifying a relation between a first related entity at the beginning of the path and a second related entity at the end of the path.

AA: The system as any of paragraph X-Z recite, wherein the determining the inter-sentential path between the first entity and the second entity further comprises: identifying a plurality of nodes in the document; identifying a plurality of edges in the document, wherein an edge comprises a dependency link between two nodes of the plurality of nodes; and combining two or more edges between the first entity and the second entity.

AB: The system as paragraph X-AA recites, wherein the dependency link comprises one or more of: a discourse link; an adjacency link; or a co-reference link.

AC: The system as any of paragraph X-AB recite, wherein the first sentence and the second sentence are adjacent sentences in the document.

AD: The system as any of paragraph X-AC recite, wherein the classifier identifies the relation between the first entity and the second entity based at least in part on one or more links of the inter-sentential path.

AE: The system as any of paragraph X-AD recite, wherein the classifier references a knowledge base to identify the relation between the first entity and the second entity.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing devices 300, such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   a computer storage media including instructions for a relation extraction framework, that, when executed by the one or more processors, cause the relation extraction framework to perform operations comprising:
      processing at least two sentences of a document;
      determining a plurality of inter-sentential paths between a first entity in a first sentence of the at least two sentences and a second entity in a second sentence of the at least two sentences;
      applying a classifier to each inter-sentential path;
      identifying, by the classifier for each inter-sentential path, a relation between the first entity and the second entity based on the inter-sentential path; and
      identifying, by the classifier from the plurality of inter-sentential paths, a shortest distance path between the first entity and the second entity.

2. The system as claim 1 recites, the operations further comprising:
   receiving a training document comprising at least two related entities; and
   training one or more parameters of the classifier to identify a relation between the at least two related entities.

3. The system as claim 2 recites, the operations further comprising:
   identifying a path between the at least two related entities;
   training the one or more parameters to identify the path linking the at least two related entities;
   receiving a second training document comprising the path; and
   identifying a relation between a first related entity at the beginning of the path and a second related entity at the end of the path.

4. The system as claim 1 recites, wherein the determining the inter-sentential path between the first entity and the second entity further comprises:
   identifying a plurality of nodes in the document;
   identifying a plurality of edges in the document, wherein an edge comprises a dependency link between two nodes of the plurality of nodes; and
   combining two or more edges between the first entity and the second entity.

5. The system as claim 4 recites, wherein the dependency link comprises one or more of:
   a discourse link;
   an adjacency link; or
   a co-reference link.

6. The system as claim 1 recites, wherein the first sentence and the second sentence are non-adjacent sentences in the document.

7. The system as claim 1 recites, wherein the classifier identifies the relation between the first entity and the second entity based at least in part on one or more links of the inter-sentential path.

8. The system as claim 1 recites, wherein the classifier references a knowledge base to identify the relation between the first entity and the second entity.

9. A computer-implemented method, comprising:
   receiving a document comprising two or more sentences;
   identifying a first entity in a first sentence and a second entity in a second sentence;
   determining a plurality of inter-sentential paths between the first entity and the second entity;
   applying a classifier to each inter-sentential path between the first entity and the second entity;
   identifying, by the classifier for each inter-sentential path, a relationship between the first entity and the second entity based on the inter-sentential path; and
   identifying, by the classifier from the plurality of inter-sentential paths, a shortest distance path between the first entity and the second entity.

10. The method as claim 9 recites, further comprising storing the relationship between the first entity and the second entity in a knowledge base.

11. The method as claim 9 recites, wherein determining a plurality of inter-sentential paths comprises:
    identifying a plurality of nodes in the document; and
    identifying a plurality of edges in the document, wherein an edge comprises a dependency link between two nodes of the plurality of nodes.

12. The method as claim 11 recites, wherein the dependency link comprises an inter-sentential link.

13. The method as claim 11 recites, wherein the dependency link comprises at least one of:
a discourse link;
an adjacency link; or
a co-reference link.

14. The method as claim 9 recites, further comprising:
receiving a training document comprising at least two related entities; and
training one or more parameters of the classifier to identify the relationship between the at least two related entities.

15. The method as claim 14 recites, further comprising:
identifying a path between the at least two related entities;
training the one or more parameters to identify the path linking the at least two related entities;
receiving a second training document comprising the path; and
identifying a relation between a first related entity at the beginning of the path and a second related entity at the end of the path.

16. A computer storage medium having thereon computer-executable instructions, the computer-executable instructions responsive to execution configuring a device to perform operations comprising:
receiving a document comprising two or more sentences;
identifying a first entity in a first sentence and a second entity in a second sentence;
determining a plurality of inter-sentential paths between the first entity and the second entity;
applying a classifier to each inter-sentential path between the first entity and the second entity;
identifying, by the classifier for each inter-sentential path, a relationship between the first entity and the second entity based on the inter-sentential path; and
identifying, by the classifier from the plurality of inter-sentential paths, a shortest distance path between the first entity and the second entity.

17. The computer storage medium as claim 16 recites, further comprising storing the relationship between the first entity and the second entity in a knowledge base.

18. The computer storage medium as claim 16 recites, wherein determining a plurality of inter-sentential paths comprises:
identifying a plurality of nodes in the document; and
identifying a plurality of edges in the document, wherein an edge comprises a dependency link between two nodes of the plurality of nodes.

19. The computer storage medium as claim 16 recites, further comprising:
receiving a training document comprising at least two related entities; and
training one or more parameters of the classifier to identify the relationship between the at least two related entities.

20. The computer storage medium as claim 19 recites, further comprising:
identifying a path between the at least two related entities;
training the one or more parameters to identify the path linking the at least two related entities;
receiving a second training document comprising the path; and
identifying a relation between a first related entity at the beginning of the path and a second related entity at the end of the path.

* * * * *